United States Patent
Ohlhafer et al.

(10) Patent No.: US 10,822,256 B2
(45) Date of Patent: Nov. 3, 2020

(54) DOMESTIC APPLIANCE HAVING A PEF UNIT

(71) Applicant: BSH HAUSGERAETE GMBH, Munich (DE)

(72) Inventors: Olaf Ohlhafer, Erligheim (DE); Eugen Gaplikow, Bubesheim (DE); Karl-Friedrich Laible, Langenau (DE)

(73) Assignee: BSH Hausgeraete GmbH, Munich (DE)

(*) Notice: Subject to any disclaimer, the term of this patent is extended or adjusted under 35 U.S.C. 154(b) by 0 days.

(21) Appl. No.: 16/315,908

(22) PCT Filed: Jul. 11, 2017

(86) PCT No.: PCT/EP2017/067425
§ 371 (c)(1),
(2) Date: Jan. 7, 2019

(87) PCT Pub. No.: WO2018/019575
PCT Pub. Date: Feb. 1, 2018

(65) Prior Publication Data
US 2019/0300397 A1  Oct. 3, 2019

(30) Foreign Application Priority Data

Jul. 26, 2016 (DE) .......... 10 2016 213 630

(51) Int. Cl.
*C02F 1/00* (2006.01)
*C02F 1/48* (2006.01)
(Continued)

(52) U.S. Cl.
CPC .......... *C02F 1/487* (2013.01); *C02F 1/003* (2013.01); *F25D 17/042* (2013.01);
(Continued)

(58) Field of Classification Search
CPC .. C02F 1/00; C02F 1/001; C02F 1/003; C02F 1/40; C02F 1/48; C02F 1/487; C02F 2303/00; C02F 2303/04; C02F 2307/00; C02F 2307/12; F25C 2400/00; F25C 2400/12; F25C 2400/14; F25D 17/00;
(Continued)

(56) References Cited

U.S. PATENT DOCUMENTS 5,690,978 A * 11/1997 Yin .......................... A23L 3/32
426/237
7,758,025 B2 7/2010 Swoboda

FOREIGN PATENT DOCUMENTS

CN  101486502 A  7/2009
CN  201473371 U  5/2010
(Continued)

*Primary Examiner* — Natasha E Young
(74) *Attorney, Agent, or Firm* — Laurence A. Greenberg; Werner H. Stemer; Ralph E. Locher

(57) ABSTRACT

A domestic appliance includes at least one PEF unit having at least one pair of electrodes and a network part for supplying the electrodes with an operating voltage. The operating voltage is of a suitable magnitude to expose material in a space between the electrodes to an electrical field having a field strength of at least 500 V/mm, and the duration of the exposure is short enough to avoid a breakdown. A water pipe extends through the space. A spacing between the electrodes is a maximum of 3 mm.

16 Claims, 2 Drawing Sheets

(51) Int. Cl.
    *F25D 17/04*       (2006.01)
    *F25D 23/12*       (2006.01)
(52) U.S. Cl.
    CPC ........ *F25D 23/126* (2013.01); *C02F 2209/40* (2013.01); *C02F 2303/04* (2013.01); *C02F 2307/12* (2013.01); *F25C 2400/12* (2013.01); *F25C 2400/14* (2013.01); *F25D 2317/041* (2013.01); *F25D 2317/04131* (2013.01); *F25D 2323/121* (2013.01); *F25D 2323/122* (2013.01); *F25D 2400/02* (2013.01)
(58) Field of Classification Search
    CPC ........ F25D 17/04; F25D 17/042; F25D 23/00; F25D 23/12; F25D 23/126; F25D 2317/00; F25D 2317/04; F25D 2317/041; F25D 2317/0413; F25D 2317/04131; F25D 2323/00; F25D 2323/121; F25D 2323/122; F25D 2400/00; F25D 2400/02
    See application file for complete search history.

(56) References Cited

FOREIGN PATENT DOCUMENTS

| | | | |
|---|---|---|---|
| CN | 105276907 | A | 1/2016 |
| DE | 102014213799 | A1 | 1/2016 |
| EP | 1736442 | A1 | 12/2006 |
| EP | 2072471 | A1 | 6/2009 |

\* cited by examiner

DOMESTIC APPLIANCE HAVING A PEF UNIT

CROSS-REFERENCE TO RELATED APPLICATION

This application is a national stage application claiming priority to PCT/EP2017/067425, now WO2018/019575, filed on Jul. 11, 2017, which claims priority to German Patent Application Serial No. DE102016213630, filed on Jul. 26, 2016.

BACKGROUND OF THE INVENTION

Field of the Invention

The present invention relates to a household appliance having a PEF or Pulsed Electric Field unit for combating microbe growth.

DE 10 2014 213 799 A1 discloses a household appliance, with which a PEF unit is accommodated in a storage compartment in order to decontaminate the surface of refrigerated goods stored in the storage compartment with the aid of an electrical field generated by this unit. The PEF technology is attractive from ecological standpoints since it requires no chemical agents, traces of which could be left on the food product, the energy outlay is low and the texture of the refrigerated goods essentially remains unaffected. Still, so far it has not managed to establish itself in the market, firstly due to safety problems which involve the high voltages required to generate an electrical field of the required strength in a storage compartment and secondly because the dielectric properties of the refrigerated goods have a strong influence on the electrical field in the storage compartment and it is only difficult to ensure that overall this achieves the required field strength without a breakdown resulting at any point in the storage compartment.

SUMMARY OF THE INVENTION

The object of the invention is to specify a household appliance, with which a PEF unit can be used without safety concerns and a complete sterilization of the refrigerated goods can be guaranteed.

The object is achieved by, in the case of a household appliance with a PEF unit, which comprises at least one pair of electrodes and a network part for supplying the electrodes with an operating voltage, wherein the operating voltage is of a suitable magnitude to expose material in a space between the electrodes to an electrical field with a field strength of at least 500 V/mm, and the duration of the exposure is short enough to avoid a breakdown, a water pipe extending through the space and the spacing between the electrodes being a maximum of 3 mm.

If such an internal water pipe conveys water for a long period of time and is not sealed off from the environment in a germ-proof manner, a biofilm can form therein, which may result in the water quality being affected as a result of the high germ load, bad taste or odor. A good water quality can be permanently ensured with the aid of the PEF unit. As a result of the minimal spacing between the electrodes, an output voltage of the network part in the single-digit kV region is sufficient, and can be realized with the aid of cost-effective semiconductor circuits. Since the water can be evenly distributed over the space, the field in the space is also homogenous, so that the sterilizing effect can be achieved in the entire space.

For a strong antimicrobial effect, a field strength of at least 1 kV/mm is preferred. On account of the breakdown risk 5 kV/mm should not be exceeded.

The output voltage of the network part can be selected to be lower, the narrower the space. In order at the same time to achieve a water flow rate which corresponds to the practical requirements, a width of the space of 0.5 mm is sufficient; a preferred width amounts to between 0.75 and 1.5 mm.

In order to limit the time frame during which the water is exposed to the electrical field, the operating voltage applied by the network part to the electrodes can be pulsed. The duration of the pulse with which an electrical breakdown can still be avoided depends on the field strength; in general a pulse duration of 1 ms should not be exceeded.

To ensure that all water which runs through the water pipe is exposed at least once to the influence of the electrical field, the time between two pulses is preferably shorter than the dwell time of the water between the electrodes of the pair.

As a further measure to reduce the breakdown risk, the network part can be configured to generate voltage pulses with an alternating sign. Ions contained unavoidably in the water, which have been accelerated by a voltage pulse in a first direction, are therefore decelerated by the subsequent pulse and then accelerated in the opposite direction. No ion can therefore be accelerated in the same direction by way of a number of pulses and in the process achieve a speed which would be sufficient to ionize molecules in the water and as a result to trigger a breakdown.

Another possibility of limiting the dwell time of the electrical field is to move the water through the field in a short time. The operating voltage can therefore also apply continuously to the electrodes when the ratio between the extent of the electrodes in the flow direction of the water and its flow speed amounts to below 1 ms.

In order to achieve a field strength which remains constant across the entire width of the space and therefore to achieve a homogenous antimicrobial effect across the entire cross-section of the water pipe, the electrodes are to extend parallel to one another in a direction which is orthogonal to the flow direction of the water.

In one direction parallel to the surface of the electrodes, the cross-section of the water pipe can amount to a multiple of the distance between each of the electrodes (20).

The electrodes preferably also extend in the flow direction of the water parallel to one another in order to generate a field, the field strength of which also does not change in the flow direction. This is particularly important in the case of a pulsed voltage, so that all water which passes through the pipe is exposed on its way at least once to an identical maximum field strength.

Several pairs of electrodes can be distributed along the water pipe, in order to be able to expose the water repeatedly to the electrical field on its way through the pipe.

The electrode pairs which follow the electrical fields are preferably oriented antiparallel, so that, as in the case considered above, when voltage pulses with an alternating sign are applied to an electrode pair, the ions of the water are accelerated in alternating directions in each case.

If the water pipe comprises a ring section in which the water can be circulated in a circle, at least one pair of electrodes can be arranged on the ring section so that the water can pass through the electrical field between the electrodes repeatedly.

Typically such a ring section has an inflow and an outflow and two branches, which connect the inflow and outflow, and a pump which, on the first branch, drives a water flow from the inflow to the outflow and on the second branch drives the outflow to the inflow. The electrode pair is then preferably arranged on the first branch, in order to be able to act at least once on all the water passing through the pipe.

The pump is preferably arranged on another branch than the electrode pair, so that the latter can still also have an effect on the water when the pump is stationary.

The water pipe can comprise a tank. In the case of a refrigeration appliance with a fixed water connection, the tank can be arranged between the fixed water connection and a water dispenser and in thermal contact with an evaporator, in order to cool the water fed in via the fixed water connection. Such a tank can also be filled manually, however. In particular, in the first case the electrode pair can be arranged upstream of the tank in order to prevent germs carried along in the water from reaching the tank and multiplying there. In both cases the electrode pair can be arranged downstream of the tank, in order also to ensure a hygienically faultless quality of the water output at the water dispenser in the event of the tank being exposed to germs.

Analogously the electrode pair can be arranged upstream of a filter, in order to keep germs away from the filter, or downstream of the filter, in order to prevent live germs from spreading further out of the filter.

Aside from the water dispenser already mentioned, an ice maker or a vaporizer are also considered to be consumers of the water in a refrigeration appliance, said vaporizer vaporizing water in a storage compartment of the refrigeration appliance in order there to maintain a high air humidity required for specific refrigerated goods.

BRIEF DESCRIPTION OF THE SEVERAL VIEWS OF THE DRAWING

Further features and advantages of the invention result from the description of exemplary embodiments below with reference to the appended figures, in which.

DESCRIPTION OF THE INVENTION

Figure 1:
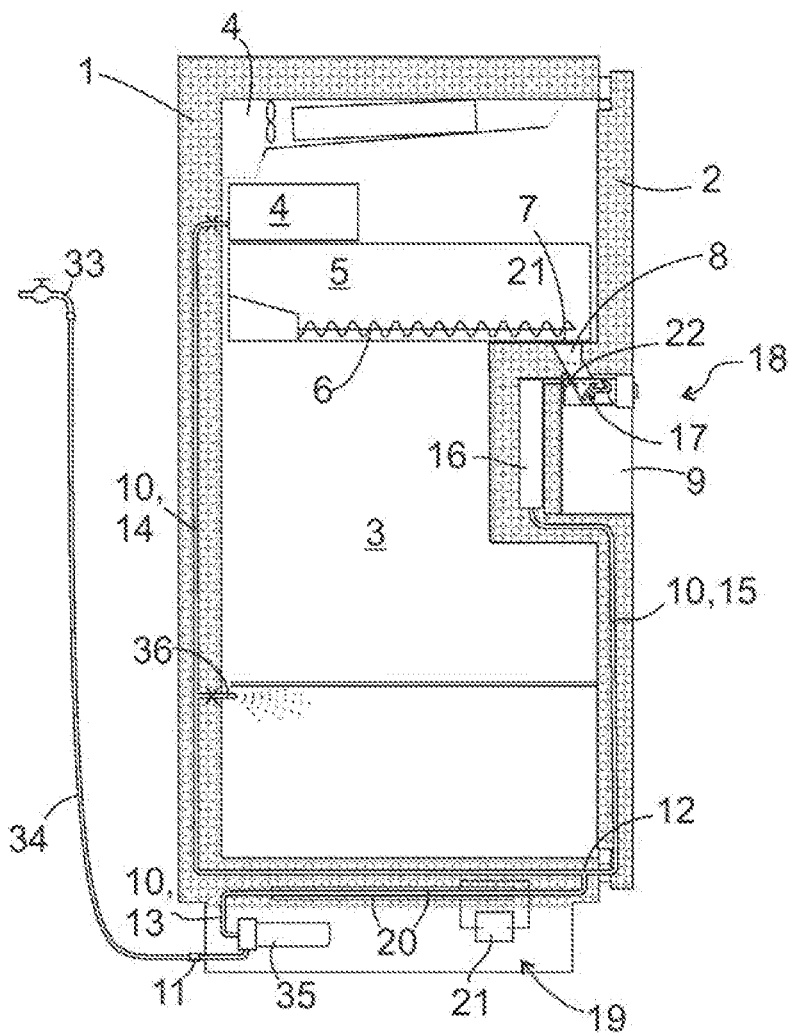
FIG. 1 shows a schematic section through a refrigeration appliance according to the invention.

FIG. 1 shows a section through a refrigeration appliance as an example of an inventive household appliance. The refrigeration appliance has a thermally insulating housing, in a manner known per se, with a body 1 and a door 2, which surrounds one or more storage compartments 3 for refrigerated goods. One of the storage compartments 3 contains an automatic ice maker 4 and a collection container 5 for pieces of ice produced by the ice maker 4. A screw conveyor 6 extends along the base of the collection container. The screw conveyor 6 can be driven rotationally, in order to slide the pieces of ice in the collection container 5 to an outlet opening 7 at the door-side end of the collection container 5. From there an ice slide 8 runs through the door 2 up to a dispenser recess 9 on the exterior of the door 2.

An atomizer 36 is provided to increase the air humidity in a vegetable compartment 37 by atomizing water and thus to extend the time that the unpackaged vegetables can be kept fresh.

An internal water pipe 10 of the refrigeration appliance has an inlet 11, which is typically connected to a fixed water connection 33 using a hose 34. At a branching 12 in the carcass 1, the internal water pipe splits into a pipe branch 14, which leads to the ice maker 4 and to the atomizer 36, and into a pipe branch 15, which leads via a tank 16 embedded in the door 2 to an outlet 17 of a water dispenser 18 under the ceiling of the dispenser recess 9. A water filter 35 and a PEF unit 19 are arranged on a shared pipe section 13, upstream of the branching 12, in order to filter and sterilize the water fed to the consumers, ice maker 4, water dispenser 18 and atomizer 36. FIG. 1 shows the PEF unit 19 between the water filter 35 and the branching 12, so that it acts on the already filtered water in order to protect the users against possible exposure to germs in the water filter 35; the reverse sequence could likewise be considered, in order to counteract an accumulation of germs from the fixed water connection 11 in the water filter 35.

The PEF unit 19 in FIG. 1 comprises two electrodes 20 in the form of flat plates, between which the water pipe 10 with the flattened pipe cross-section extends, and a network part 21, which supplies the electrodes 20 with a pulsed voltage. The amplitude of the voltage pulse is dependent on the distance between the electrodes 20 and the dielectricity constant of the wall material in the water pipe 10 such that an electrical field strength between 1 kV/mm and 3 kV/mm is achieved in the water in the pipe 10 between the electrodes 20. The duration which the voltage pulse is permitted to have as a maximum in order to prevent an electrical breakdown in the water in a particular case is dependent on the field strength but should however generally not exceed 1 ms.

The water volume V which is exposed to a single voltage pulse is produced as a product of the cross-section of the A water pipe 10 and the length l of the electrodes 20 measured along the water pipe 10. When Q refers to the flow rate of a consumer, then while this consumer takes in water, the water in the PEF unit 19 is replaced with frequency Q/V. To ensure that no water is able to pass through the PEF unit without being exposed to a voltage pulse, the frequency of the pulse must be higher than Q/V.

To improve the sterilizing effect, it is basically desirable for each water volume to be exposed to a plurality n of pulses while passing through the PEF unit, i.e. for the pulse frequency to amount to nQ/V. If during the course of a pulse accelerated ions are still not fully thermalized before introducing the next pulse, they can be so significantly accelerated in the course of several pulses that they ionize water molecules themselves and the ion concentration which increases significantly in this way results in a breakdown. The lower therefore the pulse frequency is recorded, the longer the electrodes 20 have to be in order to be able to expose the water to a desired number of pulses. In order to achieve an effective sterilization with a compact PEF unit, it is therefore preferable for the network part 21 to deliver pulses with an alternating sign, so that ions which have been accelerated by a first pulse in a first direction are accelerated by the subsequent pulse in the opposite direction.

Since there is no current flow through the water, the power consumption of the PEF unit 19 is low; it can therefore run with a fixed frequency while the refrigeration appliance is in operation. It is also conceivable, however, to couple the PEF unit 19 to a flow sensor arranged on the shared pipe section 13 or to a control unit of the ice maker and a valve 22 of the water dispenser 18, in order to operate the PEF unit only then with the pulse frequency nQ/V when water flows in the water pipe 10. When the water is stationary, the network part 21 can be switched off or generate pulses with a very low frequency, in order to prevent microbes from wandering out through the PEF unit 19 by themselves.

A filter 35, e.g. an active carbon filter, can be provided on the shared section 13 upstream or downstream of the PEF unit 19.

Figure 2:
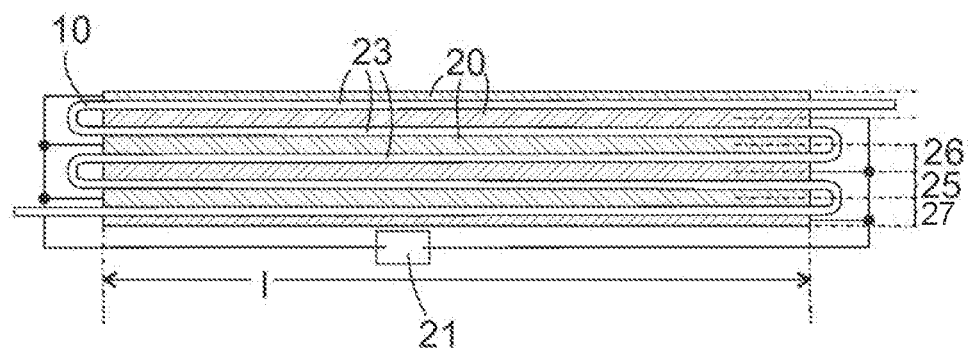
FIG. 2 shows a schematic section through a PEF unit which can be used in the refrigeration appliance.

FIG. 2 shows a section through a compact embodiment of the PEF unit 19. Its electrodes 20 are arranged in a stack and in each case are connected alternately with the two pole terminals of the network part 21, so that in each case two electrodes 20 arranged on both sides of a gap 23 extended at right angles to the flow direction of the water form a pair 25, 26, 27 . . . and a voltage pulse output by the network part 21 generates an electrical field in each gap 23. With the exception of the two outermost electrodes of the stack, all electrodes 20 here belong to two pairs 25, 26, 27 . . . at the same time. The water pipe 10 runs in a meander-type manner through the spaces 23.

Figure 3:
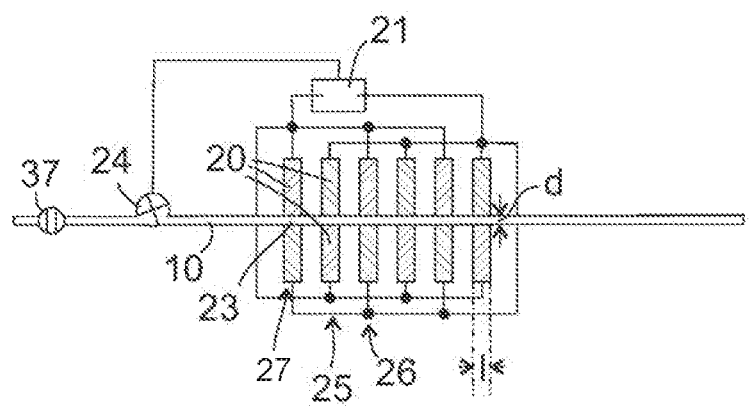
FIG. 3 shows a schematic section through an alternative PEF unit.

FIG. 3 shows an alternative design of the PEF unit 19 in a section in the longitudinal direction of the water pipe 10. The network part 21 is coupled here to a flow sensor 24 or to the control unit of the ice maker and the valve 22 of the water dispenser 18, in order to output a constant voltage to the electrodes 20 when a predetermined flow rate Qmin is exceeded. The electrodes 20 form a number of pairs 25, 26, 27, . . . which follow one another in the flow direction along the water pipe 10. They take the form of rods which extend in each case parallel to one another at right angles to the flow direction and delimit a space 23, through which the water pipe 10 runs. The distance d between the electrodes 20 which face one another in pairs amounts to approx. 1 mm. The extent of the electrodes 20 and the water pipe 10 at right angles to the drawing plane is a multiple of d and can amount to above 1 cm. The length 1 of the electrodes 20, measured in the flow direction of the water, is considerably smaller here than in the case in FIGS. 1 and 2, typically 1 cm or less, and is of a suitable magnitude such that the maximum dwell time V/Qmin=1 A/Qmin of the water between the electrodes of a pair does not exceed 1 ms. The movement of the water therefore ensures that the dwell time of the field is not long enough to cause a breakdown.

In order to avoid a deformation of the pipe 10 and the electrodes 20 on account of the pressure from the water, the pipe 10 only has the afore-described flattened cross-section between the electrodes 20, and a shut-off valve 37 is arranged upstream of the PEF unit 19 on the water pipe 10. By the shut-off valve 37 only then being open when a consumer draws in water, the pipe 10 downstream of the shut-off valve 37 can be kept at a lower pressure than that of the fixed water connection 33.

The electrodes 20 of various pairs 25, 26, 27 . . . which follow one another on the same side of the pipe 10 are each connected to different pole terminals of the network part 21, so that the electrical fields, to which the water is exposed when passing between the pairs 25, 26, 27, . . . , are each oriented antiparallel and an ion accelerated in the field of a first electrode pair is delayed again in the field of the subsequent pair and is accelerated in the opposite direction.

When the flow rate of the water in the pipe 10 lies below Qmin but differs from zero, e.g. because the ice maker 4 has a considerably lower flow rate when its ice cube molds are being filled than the water dispenser 18 when tapping at the outlet 17, then a direct voltage present on the electrodes 20 can result in a breakdown. To avoid this and still also in this case to guarantee a sterilization of the water, provision can be made for the network part 21 to deliver a pulsed output voltage in the case of a flow rate between 0 and Qmin.

Alternatively, a PEF unit 19 can be provided individually on each pipe branch 14, 15 instead of on the shared pipe section 13 and in each case be dimensioned in a manner adjusted to the consumers 4, 36 or 18 supplied thereby. More precisely, in such a case cross-section area A and electrode length l of a PEF unit are smaller on the pipe branch 14 than with a PEF unit on the pipe branch 15 and both PEF units can be operated independently of one another so that the PEF unit only operates on the pipe branch 14 when the ice maker 4 or the atomizer 36 takes in water, and the PEF unit only operates on the pipe branch 15 when the valve 22 is open, and in the case of both a dwell time of the water in the field of an electrode pair of at most 1 ms is achieved.

Figure 4:
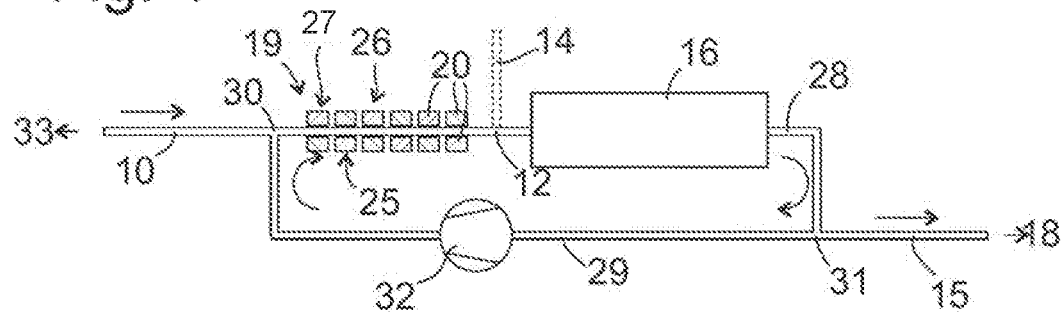
FIG. 4 shows a detail of an internal water pipe according to a preferred embodiment.

A preferred type of attachment of the PEF unit 19 to the water pipe 10 is shown in FIG. 4. The water pipe 10 here comprises a ring section with two branches 28, 29, which are connected by way of an inflow 30 to the fixed water connection 33 and by way of an outflow 31 with the outlet 17 in the dispenser recess 9. The PEF unit 19 and the tank 16 are located in the same branch 28. A pump 32 is arranged in the other branch 29. As long as the pump 32 is not in operation, it blocks the branch 29, so that when the valve 22 is open water only flows via the branch 28 and is sterilized by the PEF unit 19 before reaching the outlet 17.

In order to prevent a large number of germs from forming there in the event of the water staying longer in the tank 16, the pump 32 is set into operation from time to time so that the water in the ring section circulates in a circle and in the process can be treated in the PEF unit 19.

Since in the embodiment in FIG. 4 the water can pass through the PEF unit 19 as often as required, it is not absolutely necessary here for each water volume to be exposed to one or more voltage pulses already when passing through the PEF unit 19 for the first time. The electrodes 20 of this PEF unit 19 may therefore be more compact than the unit designed for the single water passage, and a number of electrode pairs 25, 26, 27 . . . are also not necessarily needed one after another. Since water which remains untreated when passing through the PEF unit 19 for the first time can be prevented from mixing with the cold water output at the outlet 17 on account of the internal design of the tank 16 or of the thermal layering forming when relatively warm water flows into the tank 16 via the pipe 10, its quality remains unaffected while the water quantity tapped at once does not increase the capacity of the tank 16 and the antimicrobial treatment of the water reaching the tank 16 again can take place if the valve 22 is closed again.

The ring section shown in FIG. 4 can be arranged entirely within the pipe branch 15; in this case the water supplied to the ice maker 4 and to the atomizer 36 can only be sterilized by a second PEF unit in the shared pipe section 13 or in the pipe branch 14. It is also conceivable, however, to provide the branching 12 in the branch 28 downstream of the PEF unit 19. The ice maker 4 and the atomizer 36 can therefore be supplied with water from the tank 16, which is possibly sterilized by passing through the PEF unit 19 a number of times.

Since the flow rates Q of the ice maker 4 are considerably lower when the ice cube molds and the atomizer 36 are filled than those of the valve 22 when water is tapped at the outlet 17, the dimensions of the electrodes 20 of the PEF unit 19 in FIG. 4 can be adjusted such that they are not adequate for a complete treatment of the water with the flow rate of the valve 22, but are adequate with that of the ice maker 4. The branching 12 can then, as shown with a dashed line in FIG. 4, be provided downstream of the PEF unit 19 between this and the tank 16 in the branch 28, so that at any time the ice maker 4 can be supplied with water treated completely in the PEF unit 19.

The flow rates Q of the ice maker 4 and of the valve 22 can be attuned to one another here in particular such that the flow speed of the water through the PEF unit 19 is sufficiently high when the valve 22 is open in order to allow the electrodes to be applied with a direct voltage, whereas while the ice maker 4 is being filled the electrodes 20 are applied with a pulsed voltage. A flow rate Q of the atomizer 36, which is possibly still lower than that of the ice maker 4, can be considered by a frequency of the voltage pulses generated by the network part 21 which is proportional to the respective flow rate.

REFERENCE CHARACTERS

1 Body
2 Door
3 Storage compartment
4 Ice maker
5 Collection container
6 Screw conveyor
7 Outlet opening
8 Ice chute
9 Dispenser recess
10 Water pipe
11 Inlet
12 Branching
13 Shared pipe section
14 Pipe branch
15 Pipe branch
16 Tank
17 Outlet
18 Water dispenser
19 PEF unit
20 Electrode
21 Network part
22 Valve
23 Gap
24 Flow sensor
25 Electrode pair
26 Electrode pair
27 Electrode pair
28 Branch
29 Branch
30 Inflow
31 Outflow
32 Pump
33 Fixed water connection
34 Hose
35 Filter
36 Atomizer
37 Shut-off valve

The invention claimed is:

1. A household appliance, comprising:
a PEF unit including at least one pair of electrodes and a network part for supplying said electrodes with an operating voltage;
said electrodes defining a space therebetween and a spacing between said electrodes being a maximum of 3 mm;
said network part supplying said operating voltage with a magnitude suitable to expose material in said space between said electrodes to an electrical field with a field strength of at least 500 V/mm and a duration of an exposure short enough to avoid a breakdown; and
a water pipe extending through said space.

2. The household appliance according to claim 1, wherein said network part supplies a pulsed operating voltage.

3. The household appliance according to claim 2, wherein said network part supplies said pulsed operating voltage with a pulse duration of a maximum of 1 ms.

4. The household appliance according to claim 2, wherein said network part supplies said pulsed operating voltage with a time between two pulses being shorter than a dwell time of water in said water pipe between said electrodes of said pair.

5. The household appliance according to claim 2, wherein said network part is configured to generate voltage pulses with an alternating sign.

6. The household appliance according to claim 1, wherein said network part is configured to output said operating voltage continuously when a ratio between an extent of said electrodes in a flow direction of water and a flow speed of the water in said water pipe is below 1 ms.

7. The household appliance according to claim 1, wherein said electrodes extend parallel to one another in a direction orthogonal to a flow direction of water in said water pipe in said space.

8. The household appliance according to claim 1, wherein a cross-section of said water pipe in a direction parallel to a surface of said electrodes is a multiple of said spacing between said electrodes.

9. The household appliance according to claim 1, wherein said electrodes of said pair extend parallel to one another in a flow direction of water in said water pipe.

10. The household appliance according to claim 1, wherein said at least one pair of electrodes includes a plurality of pairs of electrodes distributed along said water pipe.

11. The household appliance according to claim 10, wherein said pairs of electrodes include consecutive pairs of electrodes generating electrical fields being oriented antiparallel.

12. The household appliance according to claim 1, wherein said water pipe includes a ring section for circulating water in a circle, said at least one pair of electrodes being disposed on said ring section.

13. The household appliance according to claim 11, wherein said ring section has an inflow, an outflow, a first branch and a second branch, a pump drives a water flow from said inflow to said outflow on said first branch and from said outflow to said inflow on said second branch, and said electrode pair is disposed on said first branch.

14. The household appliance according to claim 1, wherein said water pipe includes a tank.

15. The household appliance according to claim 1, wherein said water pipe includes a filter.

16. The household appliance according to claim 1, wherein the household appliance is a refrigeration appliance having a consumer being a cold water dispenser, an ice maker or an atomizer.

* * * * *